US012661975B2

(12) United States Patent 
Ali et al.

(10) Patent No.: US 12,661,975 B2 
(45) Date of Patent: Jun. 23, 2026

(54) ELECTRONIC CONTROL UNIT, A SYSTEM, AND A METHOD FOR PROTECTING A RADIATOR, AND A VEHICLE PROVIDED WITH THE SAME

(71) Applicant: VOLVO TRUCK CORPORATION, Gothenburg (SE)

(72) Inventors: Rifat Fahmida Ali, Bangalore (IN); Nivir Kanti Singha Roy, Gothenburg (SE); Balachandar Kannayeeram, Bangalore (IN); Sahil Ajrawat, Bangalore (IN)

(73) Assignee: VOLVO TRUCK CORPORATION, Gothenburg (SE)

( * ) Notice: Subject to any disclaimer, the term of this patent is extended or adjusted under 35 U.S.C. 154(b) by 156 days.

(21) Appl. No.: 18/535,580

(22) Filed: Dec. 11, 2023

(65) Prior Publication Data

US 2024/0190240 A1      Jun. 13, 2024

(30) Foreign Application Priority Data

Dec. 12, 2022      (EP) ..................................... 22212758

(51) Int. Cl.
  *B60K 11/08*      (2006.01)
  *F28F 27/02*      (2006.01)
(52) U.S. Cl.
  CPC ............ *B60K 11/085* (2013.01); *F28F 27/02* (2013.01)
(58) Field of Classification Search
  CPC ........ B60K 11/085; B60K 11/04; F28F 27/02; B60Y 2200/14; B60Y 2400/3017; B60Y 2400/302
  See application file for complete search history.

(56) References Cited

U.S. PATENT DOCUMENTS

| | | | | |
|---|---|---|---|---|
| 10,336,180 B2 * | 7/2019 | Hussain | ................. | F02B 33/40 |
| 10,769,457 B1 * | 9/2020 | Diehl | ..................... | G06V 20/58 |
| 11,091,026 B2 | 8/2021 | Mussack et al. | | |
| 2011/0137530 A1 * | 6/2011 | Kerns | ..................... | G06F 17/00 |
| | | | | 180/68.1 |
| 2015/0246608 A1 | 9/2015 | Schmidt et al. | | |

(Continued)

FOREIGN PATENT DOCUMENTS

| | | |
|---|---|---|
| CN | 114261360 A | 4/2022 |
| DE | 112015005327 T5 | 8/2017 |
| FR | 3066445 A1 | 11/2018 |

OTHER PUBLICATIONS

European Search Report in corresponding European Application No. 22212758.1 dated Jul. 5, 2023 (3 pages).

*Primary Examiner* — Anne Marie Antonucci 
*Assistant Examiner* — Nicholas Patrick Langhorne 
(74) *Attorney, Agent, or Firm* — Jeffri A. Kaminski; Venable LLP

(57) ABSTRACT

An electronic control unit includes a computer system provided with a processor device. The electronic control unit is configured to: collect from at least one sensor a detection signal indicative of a presence of objects in an environment ahead of a radiator of a vehicle, collect from a thermometer a measured temperature of an engine of the vehicle control an actuator to actuate a shutter of the radiator to either open the shutter completely, or close the shutter completely, or close the shutter partially, depending on a result of a test based on the detection signal and/or on the measured temperature.

17 Claims, 4 Drawing Sheets

(56)     References Cited

U.S. PATENT DOCUMENTS

| 2017/0120744 | A1  |  5/2017 | Uehara |
| 2017/0321593 | A1* | 11/2017 | Wolff ................... B60K 11/085 |
| 2018/0229679 | A1  |  8/2018 | Yasui |
| 2021/0089815 | A1* |  3/2021 | Ghannam ....... B60W 30/18163 |
| 2021/0291640 | A1* |  9/2021 | Srivastava ........... B60K 11/085 |
| 2022/0402448 | A1* | 12/2022 | Lauffer ................... B60T 7/042 |

* cited by examiner

ELECTRONIC CONTROL UNIT, A SYSTEM, AND A METHOD FOR PROTECTING A RADIATOR, AND A VEHICLE PROVIDED WITH THE SAME

TECHNICAL FIELD

The disclosure relates generally to the protection of radiator dedicated to the cooling of engine of vehicles. In particular aspects, the disclosure relates to an electronic control unit, a system, and a method for protecting a radiator, and a vehicle provided with the same. The disclosure can be applied in heavy-duty vehicles, such as trucks, buses, and construction equipment. Although the disclosure may be described with respect to a particular vehicle, the disclosure is not restricted to any particular vehicle.

BACKGROUND

It is known to use bug screen to protect radiator of a vehicle from dust particles, pebbles, mud, and insects. There is a need to eliminate the bug screen, to reduce a part cost and to enable packaging of other parts in that area, without reducing the protection of the radiator against dust particles, pebbles, mud, and insects.

SUMMARY

According to a first aspect of the disclosure, the disclosure relates to an electronic control unit for protecting a radiator, the electronic control unit comprising a computer system provided with a processor device, the electronic control unit being configured to:

collect from at least one sensor a detection signal indicative of a presence of objects in an environment ahead of a radiator of a vehicle, collect from a thermometer a measured temperature of an engine of the vehicle, control an actuator to actuate a shutter of the radiator to either open the shutter completely, or close the shutter completely, or close the shutter partially, depending on a result of a test based on the detection signal and/or on the measured temperature. The first aspect of the disclosure may seek to protect the radiator of a vehicle from dust particles, pebbles, mud, and insects. A technical benefit may include opening or closing the shutter, partially or completely, depending on the engine cooling requirement and on the conditions in the environment of the radiator.

In some examples, the at least one sensor is at least one of a lidar, a 4D radar.

In some examples, the objects is at least one of dust, pebbles, mud, bugs or insects.

In some examples, the shutter is opened completely if the test determines that the detection signal is indicative of a level of objects greater than a predetermined level, and that the engine temperature is greater than a first predetermined threshold.

In some examples, the level of objects is for example a level of objects size, and the predetermined level of objects size may be for example comprised between a size of 0 mm and 10 mm, preferably comprised between 3 mm and 7 mm, preferably equal to 5 mm.

In some examples, the first predetermined threshold is for example comprised between 86° C. and 95° C., preferably comprised between 87° C. and 93° C., preferably equal to 90° C.

In some examples, the shutter is closed completely, if the test determines that the detection signal is indicative of a level of objects greater than a predetermined level, and that the engine temperature is lower than a second predetermined threshold, the second predetermined threshold being lower than the first predetermined threshold.

In some examples, the second predetermined threshold is for example comprised between 80° C. and 90° C., preferably comprised between 83° C. and 88° C., preferably equal to 85° C.

In some examples, the shutter is closed partially, if the test determines that the detection signal is indicative of a level of objects greater than a predetermined level, and that the engine temperature is comprised between the second predetermined threshold and the first predetermined threshold.

In some examples, the shutter is opened completely if the test determines that the engine temperature is greater than a third predetermined threshold. A technical benefit may include opening completely the shutter irrespective of the detection signal, when the engine cooling requirement is severe.

In some examples, the third predetermined threshold is for example comprised between 91° C. and 99° C., preferably comprised between 93° C. and 98° C., preferably equal to 95° C.

According to a second aspect of the disclosure, the disclosure relates to a system for protecting a radiator of a vehicle, the system comprising the radiator of the vehicle, the radiator comprising a shutter of the radiator, the shutter being actuated by an actuator of the shutter of the radiator, the system further comprising a thermometer configured to measure a temperature of an engine of the vehicle, the system further comprising an electronic control unit according to any of the embodiments described herein above. The second aspect of the disclosure may seek to protect the radiator of the vehicle from dust particles, pebbles, mud, and insects. A technical benefit may include opening or closing the shutter, partially or completely, depending on the engine cooling requirement and on the conditions in the environment of the radiator.

According to a third aspect of the disclosure, the disclosure relates to a vehicle comprising the system according to the above embodiment.

According to a fourth aspect of the disclosure, the disclosure relates to a method for actuating a shutter of a radiator of a vehicle to protect the radiator of the vehicle, the method comprising the following steps, implemented by a processor device of a computer system of an electronic control unit of the vehicle:

controlling at least one sensor to provide to the electronic control unit a detection signal indicative of the presence of objects in the environment ahead of the radiator of the vehicle;

measuring a temperature of the engine of the vehicle;

actuating the shutter of the radiator to either open the shutter completely, or close the shutter completely, or close the shutter partially, depending on the result of a test based on the detection signal and/or on the measured temperature. The fourth aspect of the disclosure may seek to protect the radiator of the vehicle from dust particles, pebbles, mud, and insects. A technical benefit may include opening or closing the shutter, partially or completely, depending on the engine cooling requirement and on the conditions in the environment of the radiator.

In some examples, the at least one sensor is at least one of a lidar, a 4D radar.

In some examples, the objects are at least one of dust, pebbles, mud, bugs.

In some examples, the shutter is opened completely if the test determines that the detection signal is indicative of a level of objects greater than a predetermined level, and that the engine temperature is greater than a first predetermined threshold.

In some examples, the level of objects is for example a level of objects size, and the predetermined level of objects size may be for example comprised between a size of 0 mm and 10 mm, preferably comprised between 3 mm and 7 mm, preferably equal to 5 mm.

In some examples, the first predetermined threshold is for example comprised between 86° C. and 95° C., preferably comprised between 87° C. and 93° C., preferably equal to 90° C.

In some examples, the shutter is closed completely, if the test determines that the detection signal is indicative of a level of objects greater than a predetermined level, and that the engine temperature is lower than a second predetermined threshold, the second predetermined threshold being lower than the first predetermined threshold.

In some examples, the second predetermined threshold is for example comprised between 80° C. and 90° C., preferably comprised between 83° C. and 88° C., preferably equal to 85° C.

In some examples, the shutter is closed partially, if the test determines that the detection signal is indicative of a level of objects greater than a predetermined level, and that the engine temperature is comprised between the second predetermined threshold and the first predetermined threshold.

In some examples, the shutter is opened completely if the test determines that the engine temperature is greater than a third predetermined threshold. A technical benefit may include opening completely the shutter irrespective of the detection signal, when the engine cooling requirement is severe.

In some examples, the third predetermined threshold is for example comprised between 91° C. and 99° C., preferably comprised between 93° C. and 98° C., preferably equal to 95° C. According to a fifth aspect of the disclosure, the disclosure relates to a computer program product comprising program code for performing, when executed by a processor device of a computer system of an electronic control unit, the method of any of the embodiments described herein above.

According to a sixth aspect of the disclosure, the disclosure relates to non-transitory computer-readable storage medium comprising instructions, which when executed by a processor device of a computer system of an electronic control unit, cause the processor device to perform the method of any of the embodiments described herein above.

The above aspects, accompanying claims, and/or examples disclosed herein above and later below may be suitably combined with each other as would be apparent to anyone of ordinary skill in the art.

Additional features and advantages are disclosed in the following description, claims, and drawings, and in part will be readily apparent therefrom to those skilled in the art or recognized by practicing the disclosure as described herein. There are also disclosed herein control units, computer readable media, and computer program products associated with the above discussed technical benefits.

BRIEF DESCRIPTION OF THE DRAWINGS

With reference to the appended drawings, below follows a more detailed description of aspects of the disclosure cited as examples.

DETAILED DESCRIPTION

Aspects set forth below represent the necessary information to enable those skilled in the art to practice the disclosure.

Figure 1:
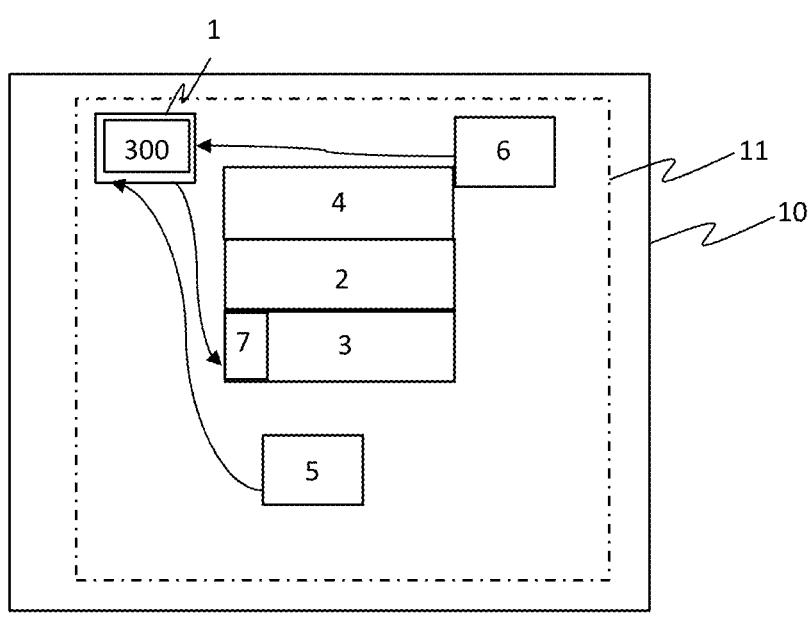
FIG. 1 is a schematic representation of a system, comprising an electronic control unit, configured to protect a radiator of a vehicle, according to one example.

FIG. 1 is a schematic representation of a system 11, configured to protect a radiator 2 of a vehicle 10, according to one example.

The radiator 2 is generally used to cool the engine 4 of the vehicle 10 to prevent the engine 4 from heating up. To this effect, the radiator 2 must be protected from objects such as dust particles, pebbles, mud, or insects which may be present ahead of the vehicle 10, in the direction of displacement of the vehicle 10, which could damage the radiator 2 and trigger a vehicle maintenance request. This may help the operator of the vehicle 10 to have better uptime by reducing maintenance.

To that effect a shutter 3 is provided in front of the radiator, the front of the radiator 2 being defined with respect to a direction of forward displacement of the vehicle 10. The shutter 3 is configured to be actuated by an actuator 7, to be either completely open, or completely closed, or partially open. The actuator 7 is controlled by an electronic control unit 1, comprising a computer system 300 comprising at least a processor device 302, such as illustrated in FIG. 4.

Figure 4:
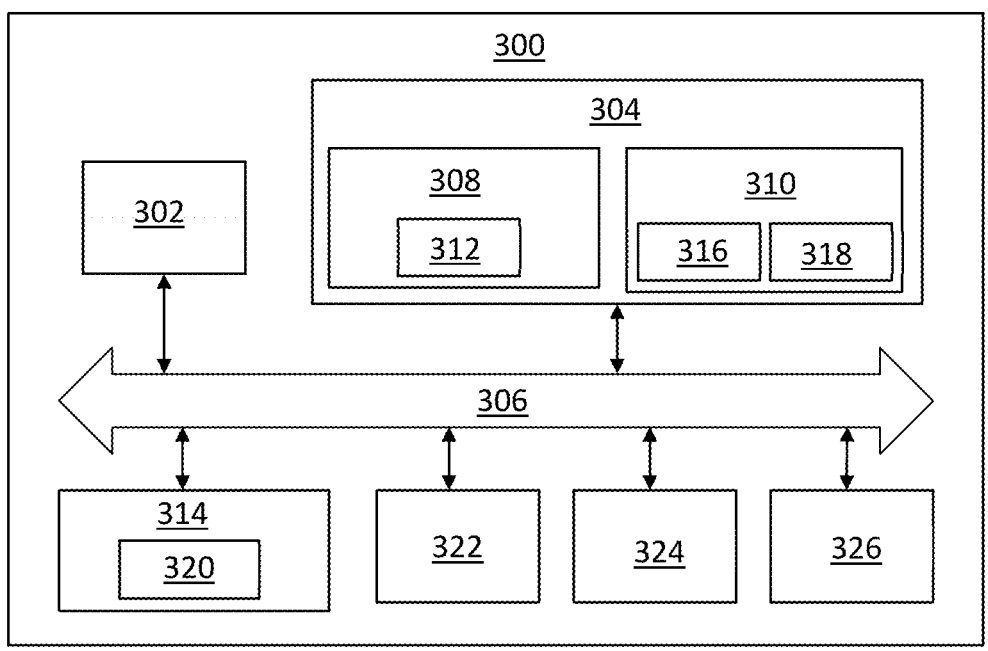
FIG. 4 is a schematic diagram of an exemplary computer system for implementing examples disclosed herein, according to one example.

FIG. 4 is a schematic diagram of a computer system 300 for implementing examples disclosed herein. The computer system 300 is adapted to execute instructions from a computer-readable medium to perform these and/or any of the functions or processing described herein. The computer system 300 may be connected (e.g., networked) to other machines in a LAN, an intranet, an extranet, or the Internet. While only a single device is illustrated, the computer system 300 may include any collection of devices that individually or jointly execute a set (or multiple sets) of instructions to perform any one or more of the methodologies discussed herein. Accordingly, any reference in the disclosure and/or claims to a computer system, computing system, computer device, computing device, control system, control unit, electronic control unit (ECU), processor device, etc., includes reference to one or more such devices to individually or jointly execute a set (or multiple sets) of instructions to perform any one or more of the methodologies discussed herein. For example, control system may include a single control unit or a plurality of control units connected or otherwise communicatively coupled to each other, such that any performed function may be distributed between the control units as desired. Further, such devices may communicate with each other or other devices by various system architectures, such as directly or via a Controller Area Network (CAN) bus, etc.

The computer system 300 may comprise at least one computing device or electronic device capable of including firmware, hardware, and/or executing software instructions to implement the functionality described herein. The computer system 300 may include a processor device 302 (may also be referred to as a control unit), a memory 304, and a system bus 306. The computer system 300 may include at least one computing device having the processor device 302. The system bus 306 provides an interface for system components including, but not limited to, the memory 304 and the processor device 302. The processor device 302 may include any number of hardware components for conducting data or signal processing or for executing computer code stored in memory 304. The processor device 302 (e.g., control unit) may, for example, include a general-purpose processor, an application specific processor, a Digital Signal Processor (DSP), an Application Specific Integrated Circuit (ASIC), a Field Programmable Gate Array (FPGA), a circuit containing processing components, a group of distributed processing components, a group of distributed computers configured for processing, or other programmable logic device, discrete gate or transistor logic, discrete hardware components, or any combination thereof designed to perform the functions described herein. The processor device may further include computer executable code that controls operation of the programmable device.

The system bus 306 may be any of several types of bus structures that may further interconnect to a memory bus (with or without a memory controller), a peripheral bus, and/or a local bus using any of a variety of bus architectures. The memory 304 may be one or more devices for storing data and/or computer code for completing or facilitating methods described herein. The memory 304 may include database components, object code components, script components, or other types of information structure for supporting the various activities herein. Any distributed or local memory device may be utilized with the systems and methods of this description. The memory 304 may be communicably connected to the processor device 302 (e.g., via a circuit or any other wired, wireless, or network connection) and may include computer code for executing one or more processes described herein. The memory 304 may include non-volatile memory 308 (e.g., read-only memory (ROM), erasable programmable read-only memory (EPROM), electrically erasable programmable read-only memory (EEPROM), etc.), and volatile memory 310 (e.g., random-access memory (RAM)), or any other medium which can be used to carry or store desired program code in the form of machine-executable instructions or data structures and which can be accessed by a computer or other machine with a processor device 302. A basic input/output system (BIOS) 312 may be stored in the non-volatile memory 308 and can include the basic routines that help to transfer information between elements within the computer system 300.

The computer system 300 may further include or be coupled to a non-transitory computer-readable storage medium such as the storage device 314, which may comprise, for example, an internal or external hard disk drive (HDD) (e.g., enhanced integrated drive electronics (EIDE) or serial advanced technology attachment (SATA)), HDD (e.g., EIDE or SATA) for storage, flash memory, or the like. The storage device 314 and other drives associated with computer-readable media and computer-usable media may provide non-volatile storage of data, data structures, computer-executable instructions, and the like.

A number of modules can be implemented as software and/or hard-coded in circuitry to implement the functionality described herein in whole or in part. The modules may be stored in the storage device 314 and/or in the volatile memory 310, which may include an operating system 316 and/or one or more program modules 318. All or a portion of the examples disclosed herein may be implemented as a computer program product 320 stored on a transitory or non-transitory computer-usable or computer-readable storage medium (e.g., single medium or multiple media), such as the storage device 314, which includes complex programming instructions (e.g., complex computer-readable program code) to cause the processor device 302 to carry out the steps described herein. Thus, the computer-readable program code can comprise software instructions for implementing the functionality of the examples described herein when executed by the processor device 302. The processor device 302 may serve as a controller or control system for the computer system 300 that is to implement the functionality described herein.

The computer system 300 also may include an input device interface 322 (e.g., input device interface and/or output device interface). The input device interface 322 may be configured to receive input and selections to be communicated to the computer system 300 when executing instructions, such as from a keyboard, mouse, touch-sensitive surface, etc. Such input devices may be connected to the processor device 302 through the input device interface 322 coupled to the system bus 306 but can be connected through other interfaces such as a parallel port, an Institute of Electrical and Electronic Engineers (IEEE) 1394 serial port, a Universal Serial Bus (USB) port, an IR interface, and the like. The computer system 300 may include an output device interface 324 configured to forward output, such as to a display, a video display unit (e.g., a liquid crystal display (LCD) or a cathode ray tube (CRT)). The computer system 300 may also include a communications interface 326 suitable for communicating with a network as appropriate or desired.

The electronic control unit 1 is thus configured to:

collect 101 from at least one sensor 5 a detection signal indicative of a presence of objects, such as dust, pebbles, mud, bugs or insects, in an environment ahead of the radiator 2 of the vehicle 10, with respect to a direction of forward displacement of the vehicle 10, collect 102 from a thermometer 6 a measured temperature of the engine 4 of the vehicle 10, control 103 the actuator 7 to actuate the shutter 3 of the radiator 2 to either open the shutter 3 completely, or close the shutter 3 completely, or close the shutter 3 partially, depending on a result of a test 103bis based on the detection signal and/or on the measured temperature.

Thus, the radiator is prevented from being damaged or clogged due to objects accumulation.

Figure 2:
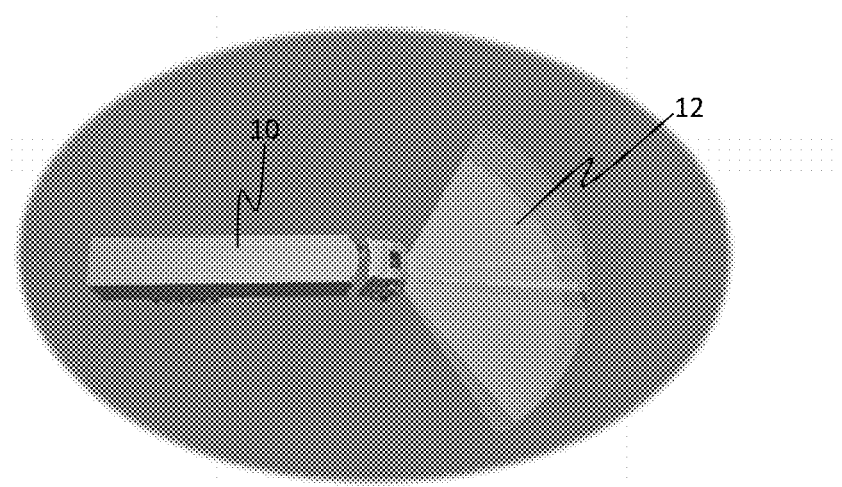
FIG. 2 is a representation of a vehicle, comprising a sensor, such as a LIDAR, configured to detect objects such as dust particles, pebbles, mud, and insects, present ahead of the radiator of the vehicle, in a field of view of the sensor, according to one example.

For example, the at least one sensor 5 has a field of view 12 ahead of the vehicle 10, with respect to a direction of forward displacement of the vehicle 10, as illustrated in FIG. 2.

More particularly, the sensor 5 may be a LIDAR, or 4D RADAR.

The LIDAR 5 detection cannot distinguish several types of particles. However, by signal processing of the multiple return pulse and optical filtering within the LIDAR 5 can detect the dust effects of the environment. The LIDAR can have both horizontal and vertical fields of view that can detect objects including the dust particles which are within the sensor field of view 12. Depending on the sensor 5 configuration, sensor 5 positioning, external environmental condition, objects characteristics, etc. . . . , the LIDAR 5 collects the photon/backscattered light. The backscattered light transforms into detection known as a LIDAR point cloud which may be analyzed, in a way known from the man skilled in the art, to provide to the electronic control unit 1 a detection signal indicative of the presence of objects, such as dust, pebbles, mud, bugs or insects.

Figures 3, 3A, 3B:
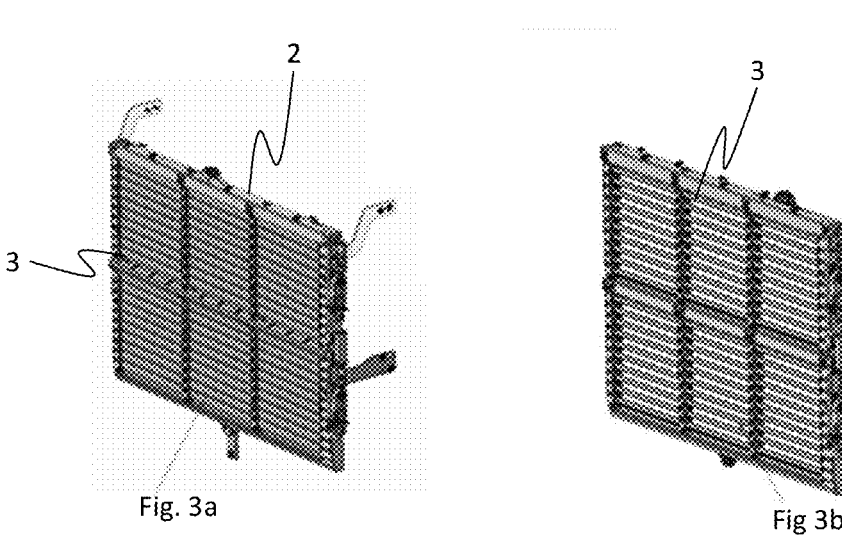
FIG. 3 is a representation of a shutter, either closed as in FIG. 3*a*, or opened as in FIG. 3*b*, configured to protect a radiator from objects such as dust particles, pebbles, mud, and insects, detected ahead of the radiator of the vehicle, in a field of view of the sensor, according to one example.

Based on a test 103bis, realized by the electronic control unit 1, on the detection signal provided by the sensor 5, and on the temperature of the engine 4, as measured by the thermometer 6, the electronic control unit 1 is configured to actuate the shutter 3. As an example, the shutter 3 is opened completely 104, as illustrated in FIG. 3b of FIG. 3, if the test 103bis determines that the detection signal is indicative of a level of objects greater than a predetermined level, and that the engine temperature is greater than a first predetermined threshold. The first predetermined threshold is for example comprised between 86° C. and 95° C., preferably comprised between 87° C. and 93° C., preferably equal to 90° C. A level of objects is for example a level of objects size, and a predetermined level of objects size may be for example comprised between a size of 0 mm and 10 mm, preferably comprised between 3 mm and 7 mm, preferably equal to 5 mm.

As a further example, the shutter 3 is closed completely 105, as illustrated in FIG. 3a of FIG. 3, if the test 103bis determines that the detection signal is indicative of a level of objects greater than a predetermined level, and that the engine temperature is lower than a second predetermined threshold, the second predetermined threshold being lower than the first predetermined threshold. The second predetermined threshold is for example comprised between 80° C. and 90° C., preferably comprised between 83° C. and 88° ° C., preferably equal to 85° C.

As another example, the shutter 3 is closed partially 106, if the test 103bis determines that the detection signal is indicative of a level of objects greater than a predetermined level, and that the engine temperature is comprised between the second predetermined threshold and the first predetermined threshold.

As a last example, the shutter 3 is opened completely 104 if the test 103bis determines that the engine temperature is greater than a third predetermined threshold. The third predetermined threshold is for example comprised between 91° ° C. and 99° C., preferably comprised between 93° C. and 98° C., preferably equal to 95° C.

According to an aspect of the disclosure, the disclosure relates to a system 11 for protecting a radiator 2 of the vehicle 10, the system 11 being illustrated schematically in FIG. 1, and comprising the radiator 2 of the vehicle 10, the radiator 2 comprising the shutter 3 of the radiator 2, the shutter 3 being actuated by the actuator 7 of the shutter 3 of the radiator 2, the system 11 further comprising a thermometer 6 configured to measure a temperature of the engine 4 of the vehicle 10, the system 11 further comprising the electronic control unit 1 configured as described above.

According to another aspect of the disclosure, the disclosure relates to a vehicle 10 comprising the system 11 described above.

Figure 5:
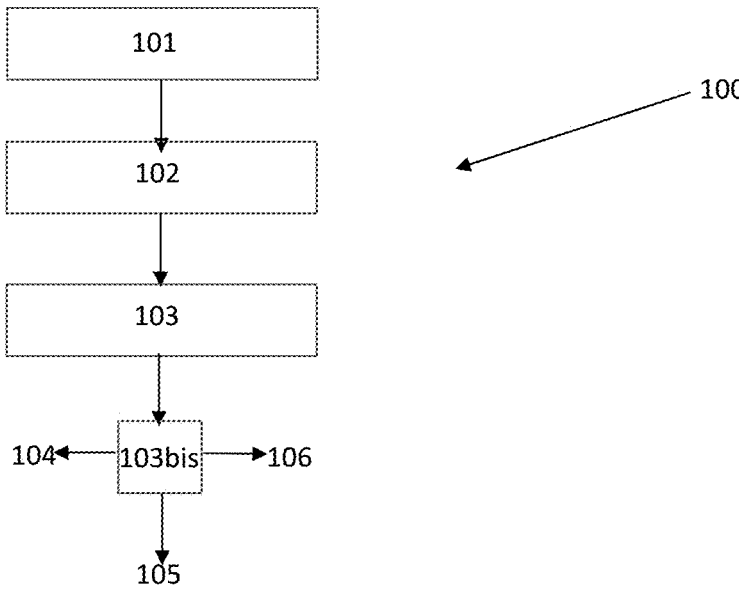
FIG. 5 is a schematic diagram of a flowchart of the steps of the method for protecting a radiator of a vehicle, according to one example.

According to another aspect of the disclosure, as illustrated by the flow chart of FIG. 5, the disclosure relates to a method 100 for actuating a shutter 3 of a radiator 2 of a vehicle 10 to protect the radiator 2 of the vehicle, the method 100 comprising the following steps, implemented by a processor device 302 of a computer system 300 of an electronic control unit 1 of the vehicle 10:

control 101 at least one sensor 5 to provide to the electronic control unit 1 a detection signal indicative of the presence of objects in the environment ahead of the radiator 2 of the vehicle 10;

measure 102 a temperature of the engine 6 of the vehicle 10;

actuating 103 the shutter 3 of the radiator 2 to either open 104 the shutter 3 completely, or close 105 the shutter 3 completely, or close 106 the shutter 3 partially, depending on the result of a test 103bis based on the detection signal and/or on the measured temperature.

As an example, the shutter 3 is opened completely 104, as illustrated in FIG. 3b of FIG. 3, if the test 103bis determines that the detection signal is indicative of a level of objects greater than a predetermined level, and that the engine temperature is greater than a first predetermined threshold.

As a further example, the shutter 3 is closed completely 105, as illustrated in FIG. 3a of FIG. 3, if the test 103bis determines that the detection signal is indicative of a level of objects greater than a predetermined level, and that the engine temperature is lower than a second predetermined threshold, the second predetermined threshold being lower than the first predetermined threshold.

As another example, the shutter 3 is closed partially 106, if the test 103bis determines that the detection signal is indicative of a level of objects greater than a predetermined level, and that the engine temperature is comprised between the second predetermined threshold and the first predetermined threshold.

As a last example, the shutter 3 is opened completely 104 if the test 103bis determines that the engine temperature is greater than a third predetermined threshold.

The operational steps described in any of the exemplary aspects herein are described to provide examples and discussion. The steps may be performed by hardware components, may be embodied in machine-executable instructions to cause a processor to perform the steps, or may be performed by a combination of hardware and software. Although a specific order of method steps may be shown or described, the order of the steps may differ. In addition, two or more steps may be performed concurrently or with partial concurrence.

Another aspect of the disclosure is a computer program product comprising program code for performing, when executed by the processor device 302 of the computer system 300 of the electronic control unit 1, the method 100 according to the above description.

Another aspect of the disclosure is a non-transitory computer-readable storage medium comprising instructions, which when executed by the processor device 302 of the computer system 300 of the electronic control unit 1, cause the processor device 302 to perform the method 100 according to the above description.

The terminology used herein is for the purpose of describing particular aspects only and is not intended to be limiting of the disclosure. As used herein, the singular forms "a," "an," and "the" are intended to include the plural forms as well, unless the context clearly indicates otherwise. As used herein, the term "and/or" includes any and all combinations of one or more of the associated listed items. It will be further understood that the terms "comprises," "comprising," "includes," and/or "including" when used herein specify the presence of stated features, integers, steps, operations, elements, and/or components, but do not preclude the presence or addition of one or more other features, integers, steps, operations, elements, components, and/or groups thereof.

It will be understood that, although the terms first, second, etc., may be used herein to describe various elements, these elements should not be limited by these terms. These terms are only used to distinguish one element from another. For example, a first element could be termed a second element, and, similarly, a second element could be termed a first element without departing from the scope of the present disclosure.

Relative terms such as "below" or "above" or "upper" or "lower" or "horizontal" or "vertical" may be used herein to describe a relationship of one element to another element as illustrated in the Figures. It will be understood that these terms and those discussed above are intended to encompass different orientations of the device in addition to the orientation depicted in the Figures. It will be understood that when an element is referred to as being "connected" or "coupled" to another element, it can be directly connected or coupled to the other element, or intervening elements may be present. In contrast, when an element is referred to as being "directly connected" or "directly coupled" to another element, there are no intervening elements present.

Unless otherwise defined, all terms (including technical and scientific terms) used herein have the same meaning as commonly understood by one of ordinary skill in the art to which this disclosure belongs. It will be further understood that terms used herein should be interpreted as having a meaning consistent with their meaning in the context of this specification and the relevant art and will not be interpreted in an idealized or overly formal sense unless expressly so defined herein.

It is to be understood that the present disclosure is not limited to the aspects described above and illustrated in the drawings; rather, the skilled person will recognize that many changes and modifications may be made within the scope of the present disclosure and appended claims. In the drawings and specification, there have been disclosed aspects for purposes of illustration only and not for purposes of limitation, the scope of the inventive concepts being set forth in the following claims.

What is claimed is:

1. An electronic control unit for protecting a radiator, the electronic control unit comprising a computer system provided with a processor device, the electronic control unit being configured to:

collect from at least one sensor a detection signal indicative of a presence of objects in an environment ahead of a radiator of a vehicle, wherein the detection signal indicates a level of objects, collect from a thermometer a measured temperature of an engine of the vehicle, control an actuator to actuate a shutter of the radiator to either open the shutter completely, or close the shutter completely, or close the shutter partially, depending on a result of a test based on the detection signal and on the measured temperature, wherein the test includes comparing the level of objects to either a predetermined size of objects or a predetermined range of sizes for the objects, and comparing the measured temperature to either a predetermined temperature threshold value or a predetermined temperature threshold range, control the actuator based on the result of the test to open the shutter completely by prioritizing the predetermined temperature threshold value and the predetermined temperature threshold range over the predetermined temperature threshold range and the predetermined range of sizes for the objects.

2. The electronic control unit of claim 1, wherein the at least one sensor is at least one of a lidar, a 4D radar.

3. The electronic control unit of claim 1, wherein the objects is at least one of dust, pebbles, mud, bugs or insects.

4. The electronic control unit of claim 1, wherein the shutter is opened completely if the test determines that the detection signal is indicative of the level of objects greater than a predetermined level, and that the engine temperature is greater than a first predetermined threshold.

5. The electronic control unit of claim 4, wherein the shutter is closed completely, if the test determines that the detection signal is indicative of the level of objects greater than a predetermined level, and that the engine temperature is lower than a second predetermined threshold, the second predetermined threshold being lower than the first predetermined threshold.

6. The electronic control unit of claim 5, wherein the shutter is closed partially, if the test determines that the detection signal is indicative of a level of objects greater than a predetermined level, and that the engine temperature is comprised between the second predetermined threshold and the first predetermined threshold.

7. The electronic control unit of claim 1, wherein the shutter is opened completely if the test determines that the engine temperature is greater than a third predetermined threshold.

8. A system for protecting a radiator of a vehicle, the system comprising the radiator of the vehicle, the radiator comprising a shutter of the radiator, the shutter being actuated by an actuator of the shutter of the radiator, the system further comprising a thermometer configured to measure a temperature of an engine of the vehicle, the system further comprising an electronic control unit according to claim 1.

9. A vehicle comprising the system according to claim 8.

10. A method for actuating a shutter of a radiator of a vehicle to protect the radiator of the vehicle, the method comprising the following steps, implemented by a processor device of a computer system of an electronic control unit of the vehicle:

controlling at least one sensor to provide to the electronic control unit a detection signal indicative of a presence of objects in an environment ahead of the radiator of the vehicle;

measuring a temperature of an engine of the vehicle, wherein the detection signal is further indicative of a level of objects; and actuating the shutter of the radiator to either open the shutter completely, or close the shutter completely, or close the shutter partially, depending on a result of a test based on the detection signal and on the measured temperature, wherein:

the test compares the level of objects to either a predetermined size of objects or a predetermined range of sizes for the objects;

the test compares the measured temperature to either a predetermined temperature threshold value or a predetermined temperature threshold range; and the result of the test prioritizes the predetermined temperature threshold value and the predetermined temperature threshold range over the predetermined temperature threshold range and the predetermined range of sizes for the objects.

11. The method of claim 10, wherein the at least one sensor is at least one of a lidar, or a 4D radar.

12. The method of claim 11, wherein the objects are at least one of dust, pebbles, mud, bugs.

13. The method of claim 10, wherein the shutter is opened completely if the test determines that the detection signal is indicative of the level of objects greater than a predetermined level, and that the engine temperature is greater than a first predetermined threshold.

14. The method of claim 13, wherein the shutter is closed completely, if the test determines that the detection signal is indicative of the level of objects greater than a predetermined level, and that the engine temperature is lower than a second predetermined threshold, the second predetermined threshold being lower than the first predetermined threshold.

15. The method of claim 14, wherein the shutter is closed partially, if the test determines that the detection signal is indicative of the level of objects greater than a predetermined level, and that the engine temperature is comprised between the second predetermined threshold and the first predetermined threshold.

16. The method of claim 10, wherein the shutter is opened completely if the test determines that the engine temperature is greater than a third predetermined threshold.

17. A non-transitory computer-readable storage medium comprising instructions, which when executed by a processor device of a computer system of an electronic control unit, cause the processor device to perform the method of claim 10.

\* \* \* \* \*